May 14, 1963  J. E. WOLF  3,089,704
SHUTTLECOCK
Filed Sept. 16, 1959

INVENTOR.
James E. Wolf
BY
Johnson and Kline
ATTORNEYS

United States Patent Office 3,089,704
Patented May 14, 1963

1

3,089,704
SHUTTLECOCK
James E. Wolf, Altoona, Pa., assignor to R. S. L. Shuttlecocks Co., Ltd., Altoona, Pa., a corporation of Pennsylvania
Filed Sept. 16, 1959, Ser. No. 840,382
2 Claims. (Cl. 273—106)

This invention relates to badminton shuttlecocks and more particularly to a novel molded head construction.

Heretofore, when shuttlecocks were made from cork or molded from sponge rubber, the heads have been provided with a smooth cover of leather or a smooth molded skin.

It is an object of the present invention to provide a shuttlecock having a simple and novel head construction which can be readily molded of thermoplastic material and have a roughened outer surface free of any skin or cover, said head being applied to a vane portion which may have a portion of thermoplastic material.

This is accomplished by molding a head portion of the shuttlecock from a polyethylene sponge, with the cells of the sponge exposed in the surface of the head to provide the traction or "grip" for the racket when in use.

Preferably, the head is provided with a neck to which the base of the vane in the form of polyethylene or the like material is connected or secured by suitable heat-sealing means or by suitable adhesives.

Other features and advantages of the invention will be apparent from the specification and claims when considered in connection with the accompanying drawings in which:

Figure 1:
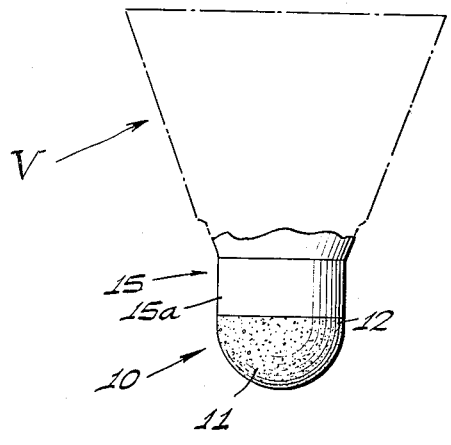
FIGURE 1 shows a side view of the head and connected vane, with the flared portion of the vane shown in dot and dash lines.

As shown in the drawings, the head 10 comprises a hemispherical front end or nose portion 11 and a cylindrical rear end portion 12. The rear end portion has a part 13 thereof reduced to form a neck and a shoulder 14. The neck is adapted to be received within the end 15 of the base of the vane which is in the form of a ring 15a snugly fitting around the neck and abutting the shoulder. Preferably, the base of the vane is made of polyethylene or the like materal and has the flared portion of the vane projecting outwardly therefrom. The flared portion of the vane V, as indicated in dot and dash lines in FIG. 1 may comprise an integral molded vane section or may be formed by the usual feathers (not shown) disposed and anchored in the base portion of the vane as is customary in the art.

According to the present invention the head is molded from a polyethylene sponge. While the sponge may be made from a polyethylene foam, it is preferably formed by mixing any suitable blowing agent known to the art with polyethylene. When this is molded the blowing agent produces small bubbles or cells in the head which extend to the surface of the head and provide a roughened surface without the usual "skin" and insures a better "grip" on a racket when the shuttlecock is hit thereby.

Figure 2:
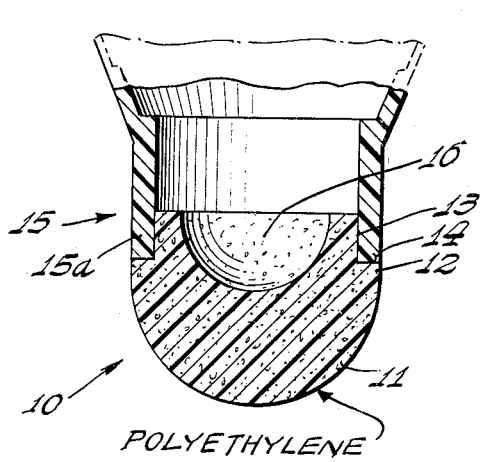
FIG. 2 is a detailed longitudinal section of the head and base of the vane in connected relation.

The head is bonded to the base of the vane, when the neck 13 is inserted in the ring portion 15a of the vane, by a suitable heat-sealing means or by suitable adhesives so as to become integral therewith. The rear of the head has a shallow recess 16, preferably a concave recess as shown in FIG. 2, to provide for proper weight and to facilitate the securing of the head to the neck by suitable heat-sealing means.

Variations and modifications may be made within the scope of the claims and portions of the improvements may be used without others.

I claim:

1. In a badminton shuttlecock adapted to be hit by a racket and having a head and vane portion, the improvement wherein said head is formed of molded polyethylene sponge having a plurality of cells therein and the outer surface of the nose portion of the head being roughened by the exposure of the cells therein whereby a better "grip" on the racket is obtained.

2. In a badminton shuttlecock adapted to be hit by a racket and having a head and vane portion, the improvement wherein an end portion of said vane is formed of molded polyethylene and said head is formed of molded polyethylene sponge having a plurality of cells therein, said head being provided with a hemispherical nose portion, the outer surface of which is roughened by the exposure of the cells therein whereby a better "grip" on the racket is obtained and said head having an outer portion of reduced diameter forming a neck to be inserted into an end portion of the vane, said end portion of the vane and head having their contacting surfaces heat-sealed to form an integral unit.

References Cited in the file of this patent

UNITED STATES PATENTS

| | | |
|---|---|---|
| 1,617,243 | Flanagan | Feb. 8, 1927 |
| 2,217,032 | Timpe | Oct. 8, 1940 |
| 2,218,593 | Ushakoff | Oct. 22, 1940 |
| 2,626,805 | Carlton | Jan. 27, 1953 |
| 2,626,806 | Carlton | Jan. 27, 1953 |
| 2,750,192 | Haslett | June 12, 1956 |
| 2,853,302 | Wolf | Sept. 23, 1958 |
| 2,860,879 | Carlton | Nov. 18, 1958 |
| 3,038,726 | Hesidence | June 12, 1962 |

FOREIGN PATENTS

| | | |
|---|---|---|
| 216,536 | Australia | July 17, 1958 |